(12) United States Patent
Mayer et al.

(10) Patent No.: US 7,430,927 B2
(45) Date of Patent: *Oct. 7, 2008

(54) LINKAGE AND SENSOR ASSEMBLY

(75) Inventors: Edward Mayer, West Orange, NJ (US); Nicholas Helmut Hesse, London, CA (US); Arthur Degenholtz, Teaneck, NJ (US)

(73) Assignee: Curtiss Wright Controls, Inc., Gastonia, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/766,125

(22) Filed: Jun. 21, 2007

(65) Prior Publication Data

US 2007/0277625 A1 Dec. 6, 2007

Related U.S. Application Data

(63) Continuation of application No. 11/059,718, filed on Feb. 16, 2005, now Pat. No. 7,296,487.

(60) Provisional application No. 60/545,511, filed on Feb. 18, 2004.

(51) Int. Cl.
*G01L 1/00* (2006.01)

(52) U.S. Cl. ............... 73/862.541; 73/862.633

(58) Field of Classification Search ............ 73/82.541, 73/862.632–862.633, 826.541, 862.541
See application file for complete search history.

(56) References Cited

U.S. PATENT DOCUMENTS

| | | | | |
|---|---|---|---|---|
| 3,735,827 | A | 5/1973 | Berryman | |
| 3,756,227 | A | 9/1973 | Sagar | |
| 3,808,885 | A | 5/1974 | Carlson | |
| 4,552,403 | A | 11/1985 | Yindra | |
| 4,867,439 | A * | 9/1989 | Salyer | 482/68 |
| 4,883,056 | A | 11/1989 | Langham | |
| 5,030,173 | A * | 7/1991 | Bryant | 474/136 |
| 5,071,119 | A * | 12/1991 | Johnson | 482/112 |
| 5,113,710 | A | 5/1992 | Wolfbauer, III | |
| 5,158,096 | A * | 10/1992 | Clark et al. | 600/590 |
| 5,193,408 | A | 3/1993 | Fukui et al. | |
| 5,207,676 | A | 5/1993 | Canadell | |
| 5,328,314 | A * | 7/1994 | Marchadour | 413/37 |
| 6,013,041 | A | 1/2000 | Leathers | |
| 6,251,111 | B1 * | 6/2001 | Barker et al. | 606/61 |
| 6,279,407 | B1 | 8/2001 | Park et al. | |
| 6,311,566 | B1 | 11/2001 | Ferguson | |
| 6,404,184 | B1 | 6/2002 | Tabrizi | |
| 6,463,847 | B1 * | 10/2002 | Rauch | 100/29 |
| 6,983,582 | B1 | 1/2006 | Muckler | |

* cited by examiner

*Primary Examiner*—Max Noori
(74) *Attorney, Agent, or Firm*—Pearne & Gordon LLP

(57) ABSTRACT

A link and sensor assembly includes a first rod, a second rod received telescopingly within the first rod, a force sensor attached between the rods and a motion limiter. The force sensor has a longitudinal range of motion. The limiter limits longitudinal motion between the rods to the range of motion and limits angular motion between the rods.

8 Claims, 5 Drawing Sheets

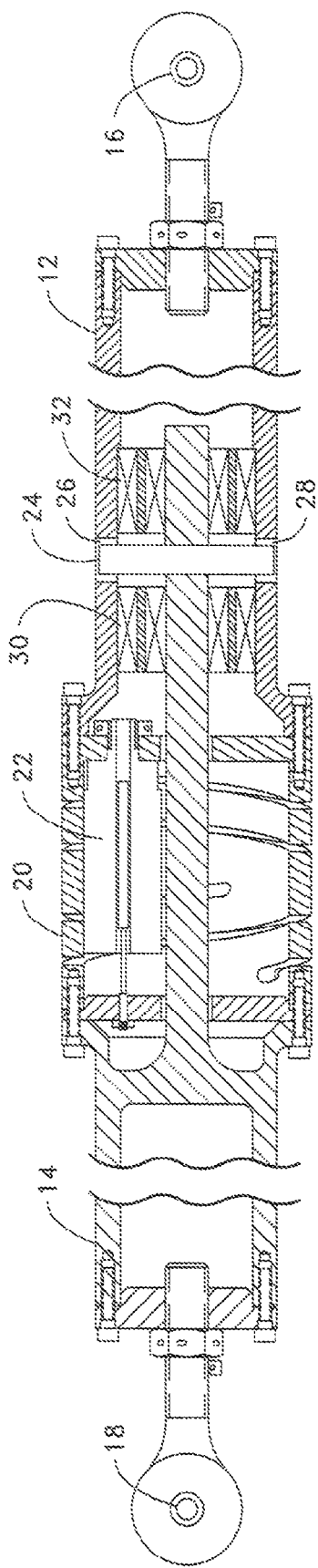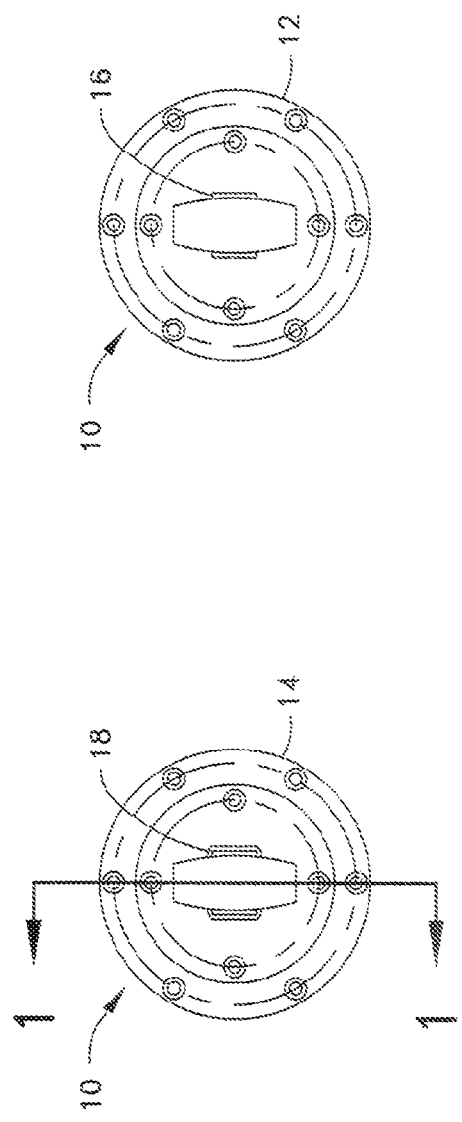
Fig.1
Fig.2
Fig.3

LINKAGE AND SENSOR ASSEMBLY

CROSS-REFERENCE TO RELATED APPLICATION

This application is a continuation of U.S. patent application Ser. No. 11/059,718 filed Feb. 16, 2005, and claims the benefit of U.S. Provisional Patent Application Ser. No. 60/545,511 filed Feb. 18, 2004, which are incorporated herein by reference in their entirety.

BACKGROUND OF THE INVENTION

The present invention is related to force-sensing linkages and, in particular, to linkages used in aircraft control systems.

The prior art related to linkages used in aircraft control systems includes U.S. Pat. No. 6,311,566 to Ferguson. This patent shows the use of an inner first tube, a second outer tube, a spring connecting the first and second tubes, a position sensor connected between the first and second tubes and a stop assembly. Stop assembly limits the relative longitudinal movement between the first and second tubes to a selected range.

The stop assembly includes an eccentrically positioned, or off-center hole, formed in an inwardly directed flange on one tube. A stop nut attached to the other tube is inserted through the off-center hole. When the stop nut is then centered, lips on the stop nut limit the relative longitudinal movement of the flange to the distance between the lips.

Assembly of this linkage is awkward and cumbersome. In addition, only a relatively small crescent shaped portion of the stop nut engages the flange.

Another problem with this design is that friction forces between the tubes result in the generation of wear particles, contamination and inaccuracy of the force measurements provided by the sensor.

In addition, this design does not provide any limits on angular movement between the tubes, simply relying on the rod ends remaining coplanar because of the orientation of respective mounting points.

SUMMARY OF THE INVENTION

A link and sensor assembly includes a first rod, a second rod received telescopingly within the first rod, a force sensor attached between the rods and a motion limiter. The force sensor has a longitudinal range of motion. The limiter limits longitudinal motion between the rods to the range of motion and limits angular motion between the rods.

BRIEF DESCRIPTION OF THE DRAWINGS

FIG. 1 is a cross sectional view along the line 1-1 of FIG. 2 showing an assembly according to the invention.

FIG. 2 is a left end view of an assembly according to the invention.

FIG. 3 is a right end view of an assembly according to the invention.

DESCRIPTION OF THE PREFERRED EMBODIMENTS

Figure 4A:
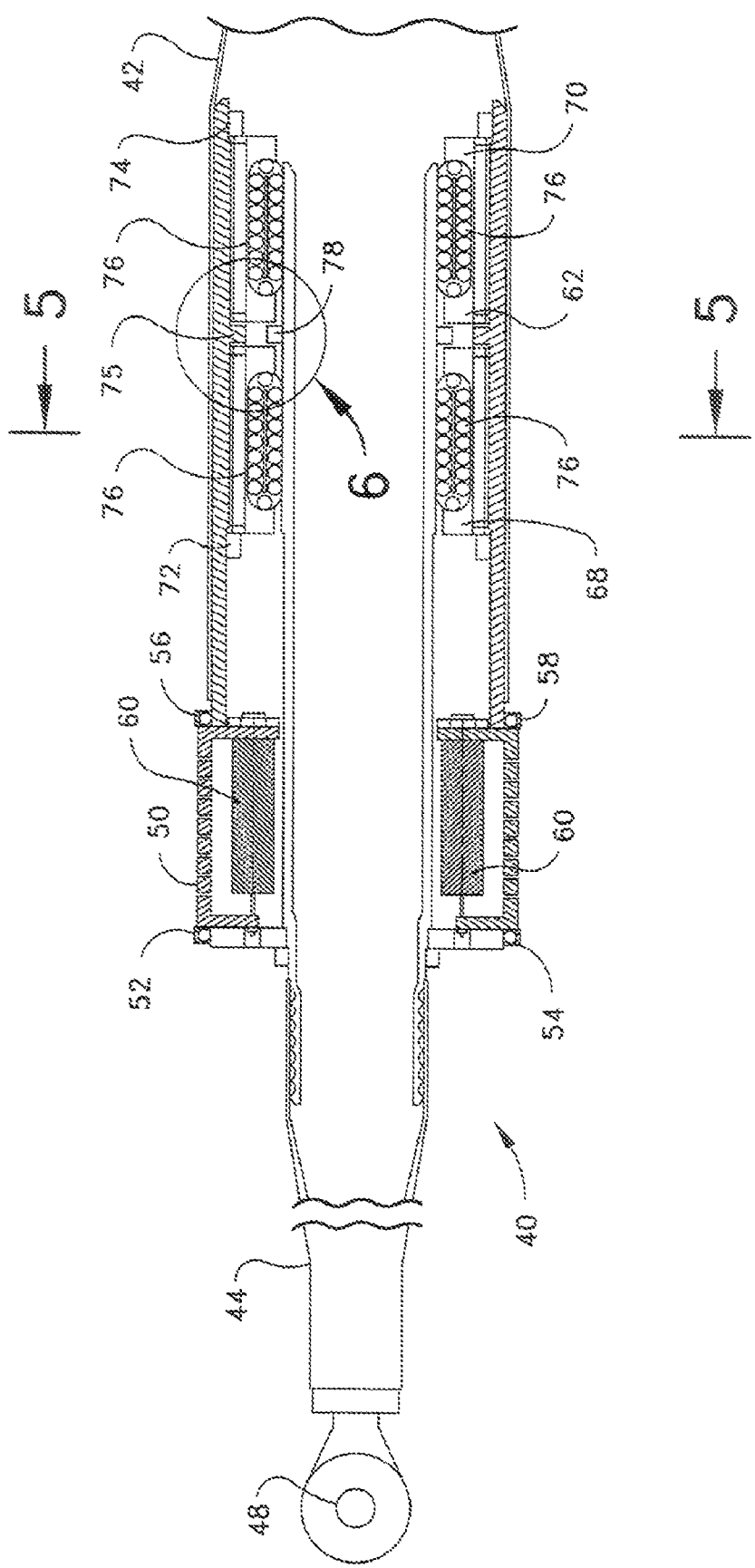
FIG. 4 is an elevation view with portions cut away of another assembly according to the invention.

Referring to FIGS. 1, 2 and 3, a link and sensor assembly 10 includes a first rod 12 and a second rod 14. These rods are provided with attachment points 16, 18, respectively. A cylindrical spring 20 is connected between the rods 12, 14. Also connected between the rods 12, 14 is a linear position sensor 22. The sensor 22 may be, for example, a linear variable differential transformer (LVDT). LVDTs are well known in the position sensing art and will not be further described.

In order to provide increased reliability through redundancy, the assembly 10 may be provided with multiple LVDT sensors 22 (for example, three total) arranged in parallel relationship within the spring 20.

The travel of the rod 12 with respect to the rod 14 is limited by the lateral pin 24 in cooperation with the one or both of the apertures 26, 28. The pin 24 may be, for example, press fit into the rod 14, though other retention methods are possible (for example, welding, glueing, threading, or peening). It should be noted that the pin may be alternatively attached to the rod 12 which would then cooperate with an aperture in the rod 14.

The rod 14 is journalled within the bearings 30, 32. The bearings 30, 32 may be, for example, bushings or an annular array of ball-race linear bearings.

In operation, the assembly 10 is attached by the mounting points 16, 18 between respective unshown structures (for example, an actuator and a flight control surface). Relative longitudinal forces between the points 16, 18 compress or tension the spring 20 resulting in longitudinal motion of the rod 14 with respect to the rod 12 as it telescopes within the rod 12. This motion is indicative of the forces applied and is measured with the position sensor 22. The sensed position in combination with the spring characteristic provides a measure of the applied force, the spring 20 and the position sensor 22 thus acting as a force sensor.

To prevent motion beyond the capabilities of the spring 20 and/or the position sensor 22 (as well as to provide a link if the spring 20 breaks or becomes detached), the pin 24 in combination with one or more of the apertures 26, 28 acts as a motion limiter. The extent the most restrictive aperture is oversized in the longitudinal direction limits the longitudinal motion of the rod 14 with respect to the rod 12 and the extent the most restrictive aperture is oversized in the circumferential direction limits the angular motion of the rod 14 with respect to the rod 12. For example, the most restrictive aperture can be longitudinally elongate to allow a desired range of longitudinal motion while being of substantially the same dimension as the pin 24 in the circumferential direction to substantially eliminate any angular motion.

The assembly 10 can be easily bolted together and the pin 24 attached to secure the assembly. The full strength of the pin 24 is available to ensure link integrity.

The use of the bearings 30, 32 minimize friction between the rods 12, 14. This improves the accuracy and repeatability of the force measurements.

The motion limiter formed of the pin 24 and one or more of the apertures 24, 28 not only limits the relative longitudinal motion of the rods 12, 14, but also, can be used to prevent relative angular motion between the rods 12, 14. This provides protection for the spring 20 and the position sensor 22. In addition, should the spring 20 and/or its connection to the rods 12, 14 fail, the link remains functional.

Figure 4B:
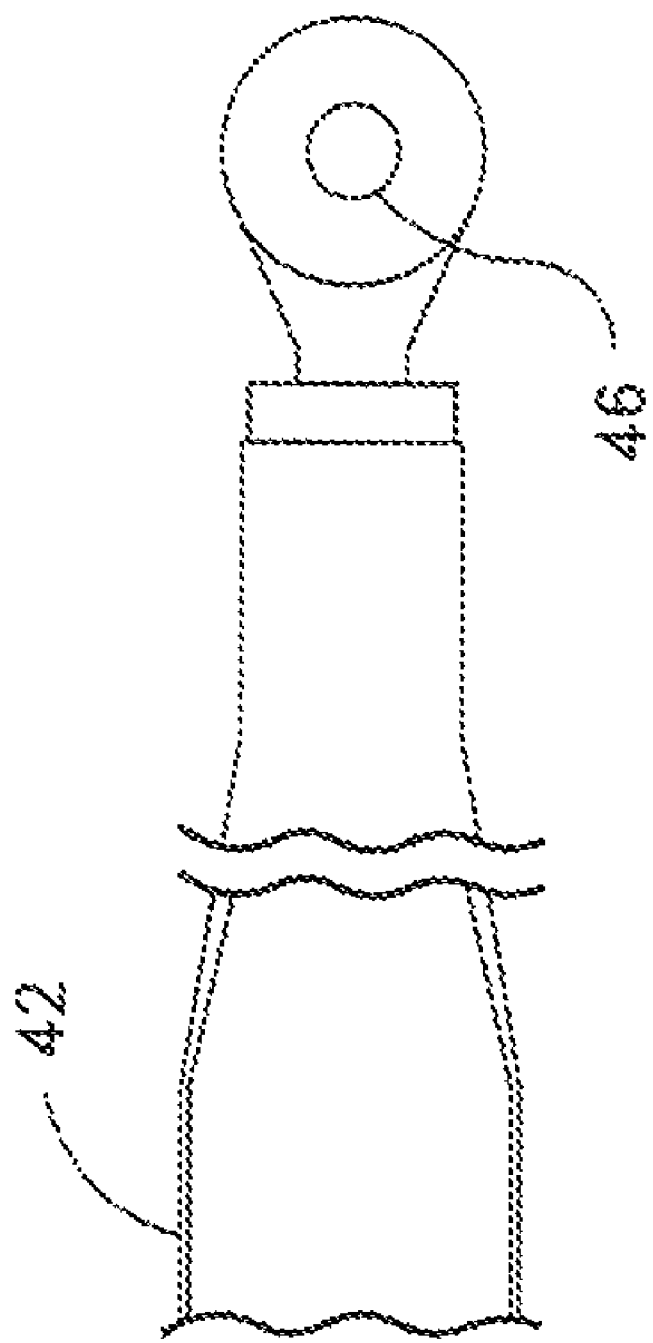

Referring to FIG. 4, another embodiment of a link and sensor assembly 40 includes a first rod 42 and a second rod 44. These rods are provided with attachment points 46, 48, respectively. A cylindrical spring 50 is connected between the rods 42, 44. The spring 50 may advantageously include integral clamps 52, 54 at one end of the spring 50 and integral clamps 56, 58 at the other end of the spring 50 (see also, FIG. 5). The ends of the spring 50 may be provided with internal threads that engage corresponding external threads on the rods 42, 44 (unshown). After screwing the spring 50 and the rods 42, 44 into threaded engagement, the clamps 52, 54, 56, 58 can be tightened to provide a secure attachment. It is also possible to use other methods of fastening the spring 40 to the rods 42, 44, for example, welding, gluing or other fasteners.

Also connected between the rods 42, 44 is a linear position sensor 60. The sensor 60 may be, for example, a linear variable differential transformer (LVDT). In order to provide increased reliability through redundancy, the assembly 40 may be provided with multiple LVDT sensors 60 arranged in parallel relationship within the spring 50.

Figure 5:
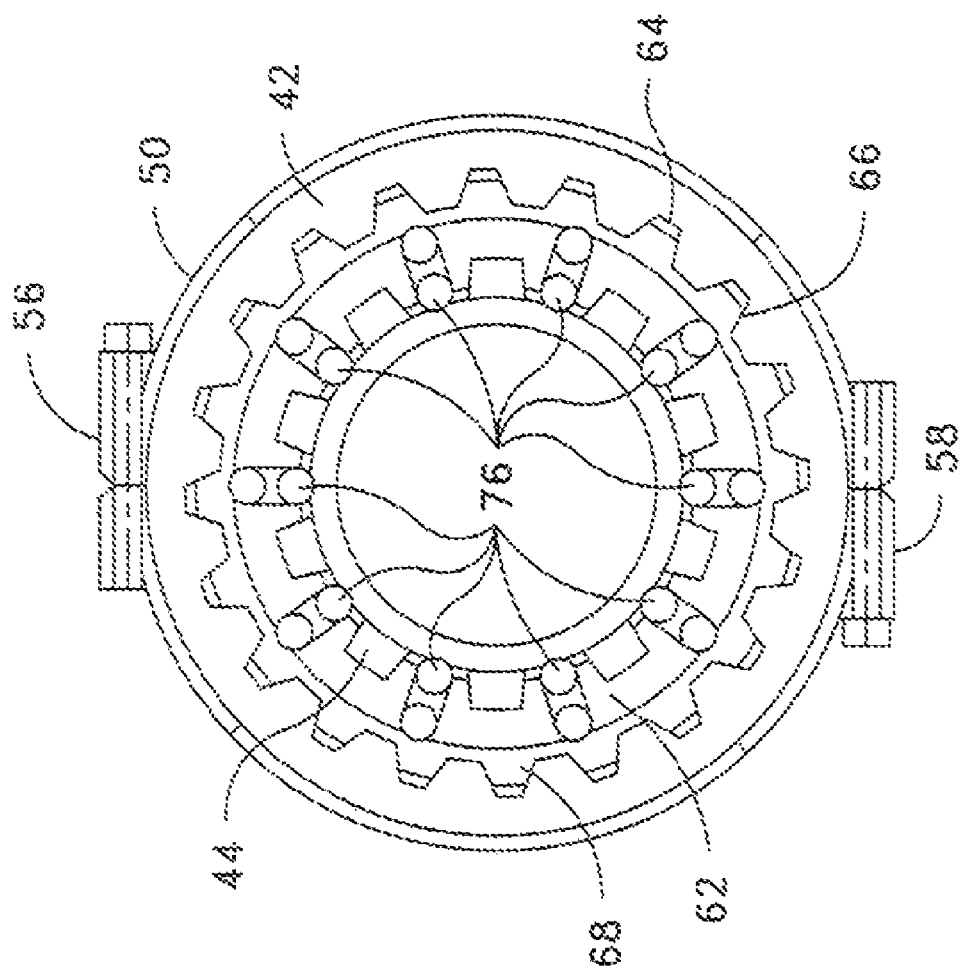
FIG. 5 is a cross sectional view along the line 5-5 of FIG. 4.

Referring to FIGS. 4 and 5, a motion limiter 62 is provided to limit the motion between the rods 42, 44 as the rod 44 telescopes within the rod 42. The rod 42 has internal splines 64 that engage the peripheral spines 66 of sleeves 68, 70. The sleeves 68, 70 may be held in place within the rod 42 with the internal lock nuts 72, 74 and a inwardly extending stop 75 on the rod 42. Between the rod 44 and the sleeves 68, 70 are arrays of ball splines 76. A portion of the race for each ball spline is formed in opposing surfaces of the rod 44. The ball spines are basically linear ball-race bearings with the race grooves and balls acting additionally as splines.

Figure 6:
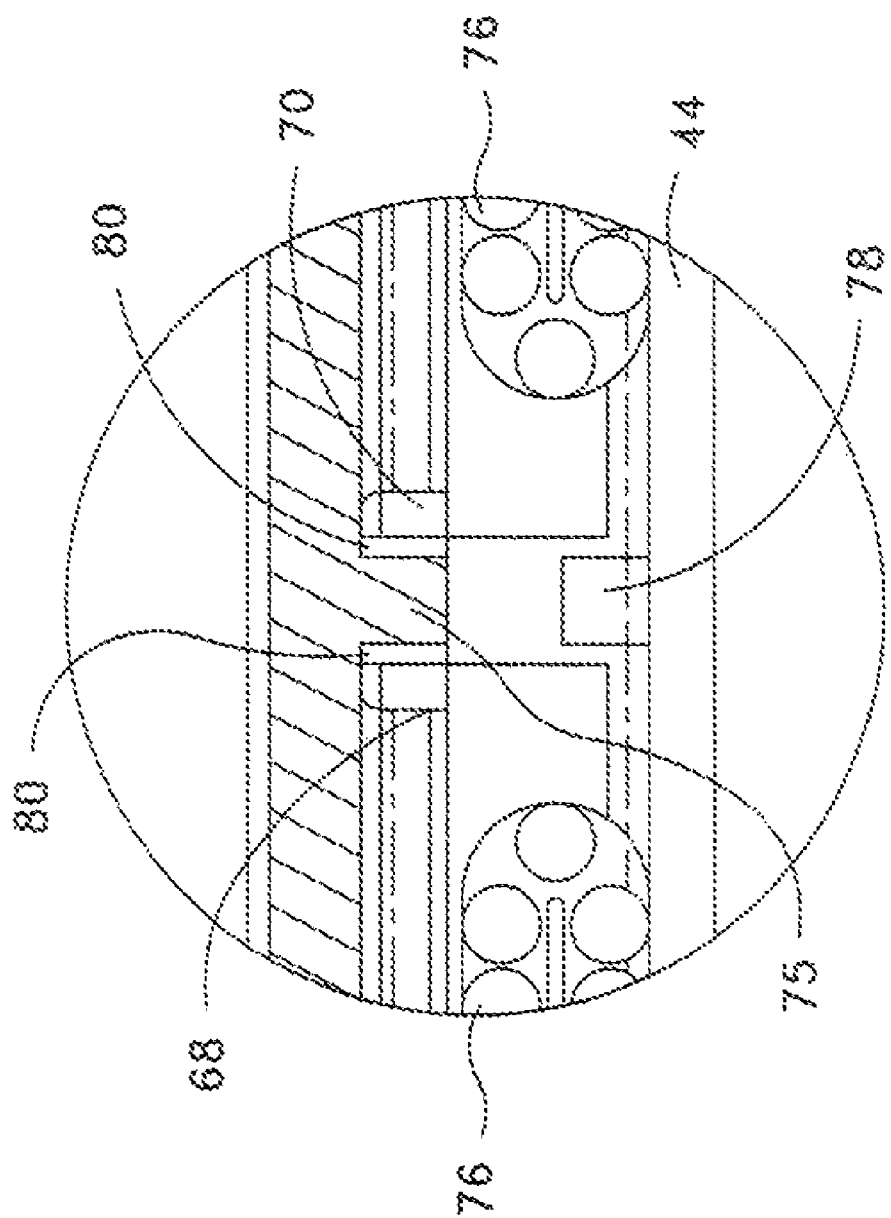
FIG. 6 is an enlarged detail of FIG. 4.

Referring also to FIG. 6, a stop 78 extends from the rod 44. The stop 78 is limited in motion between the sleeves 68, 70. The range of travel may be further adjusted through the use of shims 80.

While the use of ball splines provides an advantageously low friction between the rods 42, 44. It is also possible to replace the ball splines with conventional splines if the friction is acceptable.

In operation, the assembly 40 is attached by the mounting points 46, 48 between respective unshown structures (for example, an actuator and a flight control surface). Relative longitudinal forces between the points 16, 18 compress or tension the spring 50 resulting in longitudinal motion of the rod 44 with respect to the rod 42 as it telescopes within the rod 42. This motion is indicative of the forces applied and is measured with the position sensor 52. The sensed position in combination with the spring characteristic provides a measure of the applied force, the spring 50 and the position sensor 60 thus acting as a force sensor.

The full strength of the stops 75, 78 is available to ensure link integrity.

The use of the ball splines 68 minimize friction between the rods 42, 44. This improves the accuracy and repeatability of the force measurements.

The motion limiter 62 not only limits the relative longitudinal motion of the rods 42, 44, but also, prevents relative angular motion between the rods 42, 44. This provides protection for the spring 50 and the position sensor 60. In addition, should the spring 50 and/or its connection to the rods 42, 44 fail, the link remains functional.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

The invention claimed is:

1. A link and sensor assembly, comprising:
a first rod;
a second rod received telescopingly within said first rod;
an electrically operated force sensor attached between said rods, said force sensor having a longitudinal range of motion; and
a motion limiter, said limiter limiting longitudinal motion between said rods to said range of motion and limiting angular motion between said rods.

2. An assembly according to claim 1, wherein said force sensor includes a spring and a rod position sensor operable to determine rod position during compress and tension of the spring.

3. A link and sensor assembly, comprising:
a first rod;
a second rod received telescopingly within said first rod;
an electrically operated force sensor attached between said rods, said force sensor having a longitudinal range of motion; and
a motion limiter, said limiter limiting longitudinal motion between said rods to said range of motion and limiting angular motion between said rods;
wherein said force sensor includes a spring and a rod position sensor operable to determine rod position during compress and tension of the spring, and said rod position sensor is a linear variable differential transformer.

4. A link and sensor assembly, comprising:
a first rod;
a second rod received telescopingly within said first rod;
an electrically operated force sensor attached between said rods, said force sensor having a longitudinal range of motion; and
a motion limiter, said limiter limiting longitudinal motion between said rods to said range of motion and limiting angular motion between said rods;
wherein said force sensor includes a spring and a rod position sensor operable to determine rod position during compress and tension of the spring, and said spring includes clamps at each end for attaching said spring to respective rods.

5. A link and sensor assembly, comprising:
a first rod;
a second rod received telescopingly within said first rod;
an electrically operated force sensor operatively attached between said rods for sensing force transmission between said rods; and
a lateral pin attached to one of said rods, said pin being movable in an oversized aperture in the other rod.

6. A link and sensor assembly, comprising:
a first rod;
a second rod received telescopingly within said first rod;
an electrically operated force sensor operatively attached between said rods for sensing force transmission between said rods; and
a lateral pin attached to one of said rods, said pin being movable in an oversized aperture in the other rod,
wherein said force sensor includes a spring and a rod position sensor operable to determine rod position during compress and tension of the spring.

7. An assembly according to claim 6, wherein said rod position sensor is a linear variable differential transformer.

8. An assembly according to claim 6, wherein said spring includes clamps at each end for attaching said spring to respective rods.

* * * * *